United States Patent [19]

Neale et al.

[11] Patent Number: 4,926,749
[45] Date of Patent: May 22, 1990

[54] ROTARY COMPACTION OF FIBROUS MATERIAL

[75] Inventors: Michael A. Neale, Bedford; Wilfred E. Klinner, Milton Keynes, both of England

[73] Assignee: National Research Development Corporation, London, England

[21] Appl. No.: 418,963

[22] Filed: Oct. 10, 1989

Related U.S. Application Data

[63] Continuation of Ser. No. 220,202, Jul. 18, 1988, abandoned.

[30] Foreign Application Priority Data

Jul. 17, 1987 [GB] United Kingdom ............... 8716869

[51] Int. Cl.⁵ .................. B30B 5/00; B30B 3/04
[52] U.S. Cl. ................. 100/177; 100/81; 100/94; 100/144; 100/176; 56/341
[58] Field of Search .......... 100/65, 70 R, 70 A, 100/94, 98 R, 144, 155 R, 173, 176–178, 188 R, 189, 193, 907, 80, 81; 56/1, 341

[56] References Cited

U.S. PATENT DOCUMENTS

| 2,731,782 | 1/1956 | Mason | 100/98 R X |
| 3,105,435 | 10/1963 | Kendzia | 100/94 X |
| 3,888,170 | 6/1975 | Doering | 100/189 X |
| 4,446,678 | 5/1984 | Smith | 56/1 |
| 4,502,378 | 3/1985 | Cullen | 100/65 |
| 4,658,717 | 4/1987 | Juhuku | 100/177 X |

FOREIGN PATENT DOCUMENTS

| 159347 | 10/1954 | Austria | 100/144 |
| 19178 | 8/1914 | Denmark | 100/189 |
| 717405 | 1/1942 | Fed. Rep. of Germany | 100/189 |
| 265970 | 7/1929 | Italy | 100/144 |
| 315956 | 3/1934 | Italy | 100/81 |
| 30341 | 4/1910 | Sweden | 100/144 |
| 751358 | 7/1980 | U.S.S.R. | 100/81 |

Primary Examiner—Harvey C. Hornsby
Assistant Examiner—Stephen F. Gerrity
Attorney, Agent, or Firm—Cushman, Darby & Cushman

[57] ABSTRACT

In a compression device 100 (FIG. 1), two shafts 4,6 carry double lobed packers 5,101 which force crop through a throat formed by static elements 7,8 into a chamber 9. The packers are intermeshed and angularly displaced around their shafts to reduce the driving torque of the device.

13 Claims, 3 Drawing Sheets

ROTARY COMPACTION OF FIBROUS MATERIAL

This is a continuation of application Ser. No. 07/220,202, filed July 18, 1988, which was abandoned upon the filing hereof.

FIELD OF THE INVENTION

The present invention relates to compression devices for compressing a charge of fibrous material e.g. straw.

BACKGROUND OF THE INVENTION

Straw and other fibrous agricultural materials have traditionally been baled by feeding a column of the material into a bale chamber and compacting successive charges with a reciprocating plunger. During development of balers of conventional size, that is those with chamber cross-sections of about 350×450 mm, the plunger speeds have increased from 61 to around 100 strokes per minute, and although peak torque loadings have been smoothed, they are still very uneven.

The new generation of large balers which make bales with dimensions of up to 1400×1200 mm in cross-section still use a plunger, albeit reciprocating more slowly at 25-60 strokes per minute. Bales formed by plunger compacting machines are comprised of wads which make the bale easy to dismantle when subsequently used.

The potential of straw as a raw material is attractive if the cost of transporting and storage can be reduced. One approach is to package it in high density bales with a bulk density above 200 kg/m$^3$, another is to form it into high density briquettes with a bulk density of over 300 kg/m$^3$. Machines currently being developed to pack crop to these high densities require a pre-densification stage to pack the crop to about 100 kg/m$^3$.

SUMMARY OF THE INVENTION

The object of the present invention is to provide a compression device which at the same power input will produce a densified column or bale of straw or other fibrous material of a higher density than has currently been possible using known reciprocating plunger systems.

According to the present invention, a compression device for compressing fibrous material comprises two double-lobed rotors one of which when viewed along its axis of rotation is of a shallow S-shape having a substantially constant width, except at the end portions thereof, that is at least of the order of one-half of the length thereof, and the other one of which when similarly viewed along a parallel axis of rotation is a mirror image of said shallow S-shape, the rotors being adapted to counter-rotate about said axes with a ninety degree phase difference between corresponding parts of the rotors, the axes being spaced apart to enable intermeshing of the two rotors to provide a continually varying passageway between the rotors whereby, in operation of the device, to apply pulsating pressure to material within the passageway as it passes between the rotors in a direction determined by their senses of rotation.

Some embodiments of the invention include a pair of feed rolls adapted to compact the straw or other material as it is fed to the rotors. Where one feed roll is arranged at a higher level than the other, the upper feed roll is optionally pivotally mounted and loaded towards the lower one so as to grip the straw or other material and direct it into the path of the two rotors.

Conveniently, the device of the present invention can be used as an input mechanism for the compression chamber of a baler or briquetting or other crop-compression machine. The action of the rotors is then to form small wads of material which are forced one to the top and one to the bottom of the compression chamber by successive lobes of the rotors. The charge is therefore made up of these wads which are subsequently squashed as the crop density is increased in the compression chamber, but which will separate easily when the compressed charge is subsequently dismantled.

Friction between the lobes and the material is used to convey and compact the wads into the chamber. However, considerable heat could be generated with 50 mm wide lobes. This may be overcome by positioning a freewheeling roller near the tip region of each lobe to roll rather than slide over the crop. Alternatively, the lobes could be fitted with ceramic tips and/or the lobe contact area could be reduced e.g. by suitably relieving or recessing the lobes in their crop-engaging regions.

If desired, a 1:1 spur gear drive may be used to retain the two rotors in mesh, a small clearance between the rotors providing a grip on the material to pass it through the rotor nip.

Conveniently, the device includes fixed guide elements defining in the passageway a throat section through which the fibrous material is forced by the lobes of the rotors during operation of the device.

Preferably, the trailing edges of the guide elements are arranged to prevent or discourage material from passing back through the throat section in the opposite direction to that intended.

Conveniently, the two rotor axes are horizontally disposed with one at a higher level than the other.

Conveniently, in this case, a feedback member is positioned beneath the lower rotor to collect escaping material which is then returned to an input section of the device upstream of the two rotors by the sweeping action of the lower rotor.

In one such arrangement, the feedback member comprises a curved plate positioned beneath the lower rotor shaft to collect material fractured by the compacting action of the rotors and enable it to be swept round to the input side by the lobes so that it can become intermixed with the new material and re-enter the compaction phase. The centre line of the throat section is preferably positioned above the centre line of the chamber so as to encourage a more even vertical fill of the chamber when taking account of gravitational effects.

Conveniently, each of the two rotors comprises one element of a bank of such rotors in a so-called "multi-lobe" version of the device.

In one such embodiment, the lobes of adjacent rotor elements are angularly spaced so as to reduce the driving torque of the device.

By way of example, in one such arrangement where each rotor comprises a bank of seven rotor elements, the tips of the rotor lobes are spread at 30° angular intervals with the lobes of each rotor oriented to be in opposing quadrants of a circle and the rotors arranged so that the quadrants occupied by the lobes of one rotor alternate with the quadrants occupied by the lobes of the opposing rotor.

Where there is an odd number of rotor elements in the multi-lobe device or where the two centre elements in an even-numbered rotor element assembly are positioned as one on the rotor shaft, then it is envisaged that the lobes may be arranged so as to lie in a herringbone formation when viewed in the direction of material flow through the device, the lobes of the central rotor element or elements being arranged to contact the incoming material before contact by successive pairs of the other rotor elements. This arrangement of the rotors ensures a smooth drive torque characteristic and lower strain on the driving components. As an alternative to the herringbone formation, it is envisaged that the lobes might instead be arranged to lie in a helical formation. In either case, it may be desirable to incorporate an appropriate rejection system e.g. of known design, into the apparatus if damage from foreign objects is thought likely.

By a "herringbone formation", is meant a formation in which using the centre lobe (or lobes) as a starting point, the lobes on one side are progresively rotationally advanced (or retarded) in the same rotational sense as the lobes on the other side. By a "helical formation", on the other hand, is meant a formation in which, using the centre lobe (or lobes) as a starting point, the lobes on one side are progressively rotationally advanced (or retarded) whereas the lobes on the other side are progressively rotationally retarded (or advanced).

Conveniently, the compression device is arranged to act as a feed section to an open-ended or closed-ended baler and the invention includes such a baler e.g. a high density closed-ended baler with hydraulically-operated cleavers to part the column of straw and compact it into a bale which is then tied and ejected.

An alternative use for the mechanism would be as the input packer of a more conventional baling mechanism used for packing crop that is to be tied into bales within the baling chamber. In this configuration the tying needle assembly would be positioned so that the tips of the needles would be protected by pairs of lower fixed elements and in view of this the travel of the needles during the tying operation would be no more than two thirds that of a more conventional baler.

To allow the tying needles to pass through the chamber unobstructed by crop, a gate mechanism would have to be momentarily positioned in front of the rotors and although a slight build up of crop would result, this would disperse once the gate dropped.

Alternatively, the compression device of the present invention could be arranged to act as the loading section of a crop-briquetting machine and the invention includes such a briquetting machine. The compression device has the particular advantage in this context of being able to provide compressed crop which has the random stem orientation required if the briquetting machine is to produce satisfactory wafers. This contrasts favourably with the previously known plunger-type systems where the straws are too uniformly aligned to produce the best wafers.

An embodiment of the invention will now be described, by way of example only, with reference to the accompanying somewhat diagrammatic drawings in which:

DETAILED DESCRIPTION OF THE INVENTION

Figure 1:
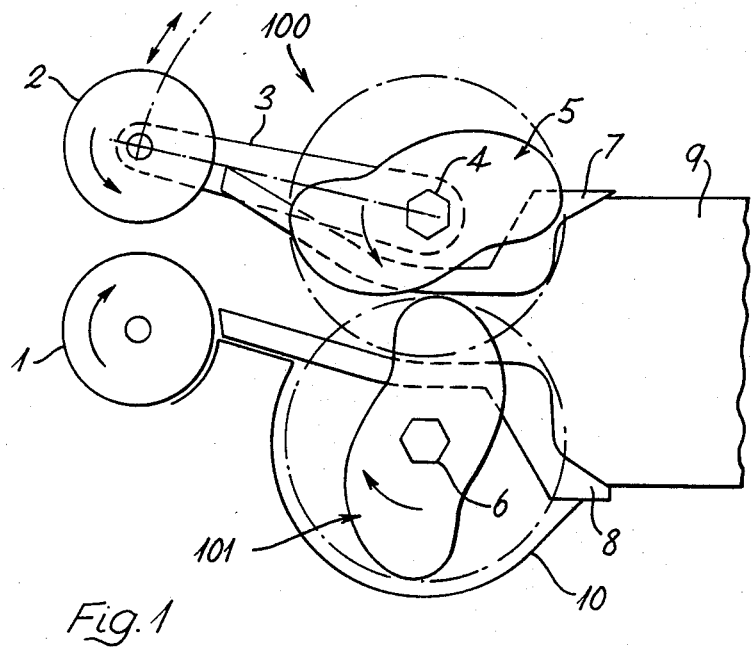
FIG. 1 is a simplified side elevation of a rotor-bank compression device in accordance with the present invention.

Thus referring now to the drawings, a multi-lobe compression device or "compactor" 100 in accordance with the present invention, comprises a rigidly mounted lower input roller 1 co-operating with an upper input roller 2 which is gravity-biassed or spring-biassed towards the roller 1 so as to grip the crop and pass it on to the packers 5,101. The frame 3 supporting the upper roller 1 is pivoted about the shaft 4 of the packer 5.

Figure 4:
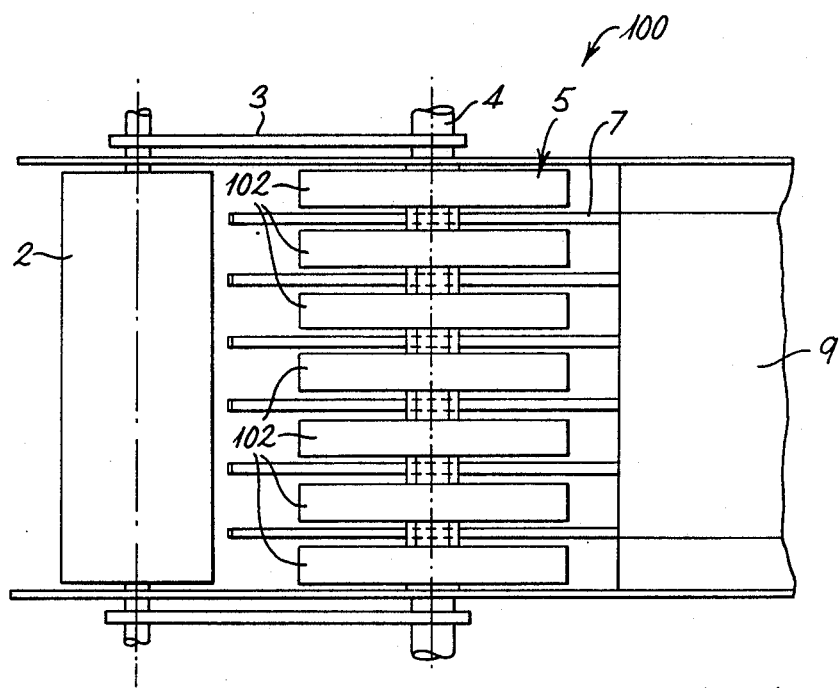
FIG. 4 shows on the same scale as FIGS. 2(a) and 2(b), a plan view of the device illustrated there.

As can be seen from FIG. 4 of the drawings, packer 5 comprises an array of double-lobed rotor elements 102, each of shallow S-shape, spaced along the rotor shaft 4. Packer 101 is similarly constructed except that the double-lobed rotor elements are of a reversed S-shape exactly mirroring the shallow S-shape of elements 102.

As indicated, the two rotors are set up with a 90° phase difference between corresponding parts of the co-operating rotor elements, the spacing between the rotor shafts 4, 6 being such as to allow substantial intermeshing between the two rotors.

A 1:1 spur gear drive (not shown) retains the relative orientation of the two packers during operation.

Fixed elements 7, 8 are positioned between the packers 5,101 and are shaped to form an inlet throat and crop retainer. In the embodiment shown, the packers 5,101 operate to feed compressed crop into the chamber 9 of an otherwise conventional baler devoid of a tying mechanism. A more even fill of the chamber 9 is achieved by having the centre line of the inlet throat positioned above the centre line of the chamber and to accommodate this difference in levels, the upper guide elements 7 have shorter retainers than the lower guide elements 8.

A guard 10 is fitted beneath the lower packer 101 to collect fragmented crop, the forwardly-sweeping action of the packer being effective to return the fragmented crop to the input side of the compactor 100.

Figure 2A:
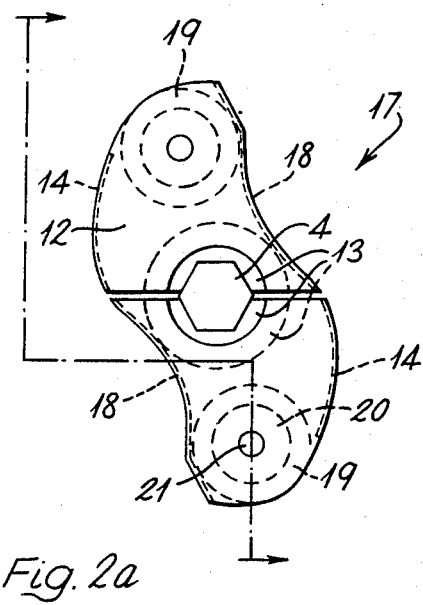
FIGS. 2(a) and 2(b) show on a larger scale than FIG. 1, side and sectional views of an alternative design of rotor element suitable for use in the device of FIG. 1, FIG. 2(b) being a section taken along the line A—A in FIG. 2(a), FIG. 3 diagrammatically indicates the angular spacing of the rotor element lobes in the device of FIG. 1.
Figure 2B:
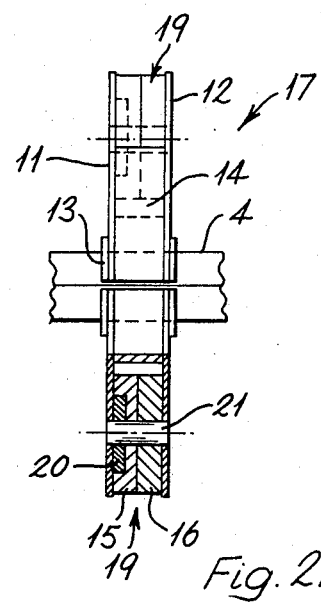

FIGS. 2(a) and 2(b) depict what is essentially a two-part rotor element for use in the device of FIG. 1 in place of the single-part elements illustrated in that Figure. As shown, the two part rotor element (17) comprises two pairs of flat lobe plates 11, 12 welded to a hexagonal-section split hub 13 and shaped wall plates 14, 18 to provide a box-form structure of substantially the same external shape and dimensions as rotor elements 5 in the FIG. 1 arrangement. Clearly, reversing the direction of assembly on to the hexagonal shaft will give the equivalent of rotor elements 101.

To achieve 30° angular displacement of the elements around the hexagonal shaft, successive elements have their hubs welded at 30° from the preceding element hub and alternate assemblies are split lengthwise (i.e. along the vertical axis shown in FIG. 2a) instead of widthwise (i.e. along the horizontal axis shown in FIG. 2a). This aligns the split with the points of the repositioned hexagonal hub.

As shown, the shaped lobe plates 14, 18 stop short of the lobe tips to leave two gaps in the rotor wall for freewheeling rollers 19, the trailing regions of which can engage the crop to reduce drag and frictional effects as the crop is pressed into the chamber.

Although not essential to the successful operation of the device, the rollers 19 are conveniently made in two parts. One part 15 (FIG. 2b), is capped to fit over a disc 20 secured to plate 11 to give firmer support for the roller axle 21. The other part 16 is a straight roller mounted on the same axle 21.

Figure 3:
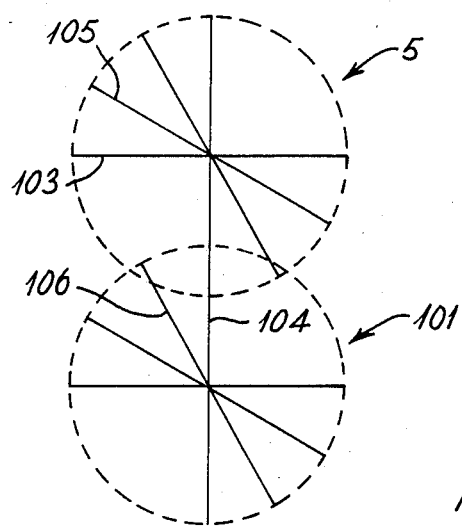

It is a preferred feature of the illustrated design of a multi-lobe device that each packer 5,101 should comprise an odd number of rotor elements as in FIG. 4. This results in the straw or other material in the machine passage-way being contacted first by the central pair of rotor elements and then by successive pairs of rotor elements arranged at equal intervals over a quadrant. For the illustrated case of seven rotor elements per shaft (the two end elements on the same shaft being aligned with one another), the angular spacing would be 30°, as indicated in FIG. 3. In this Figure, the radial lines schematically indicate tip-to-tip centre-line dimensions of the various rotor lobes, reference numerals 103 and 104 indicating the centre-lines of one pair of co-operating elements and reference numerals 105, 106 indicating the centre-lines of the elements immediately following these as the rotors rotate in the senses illustrated in FIG. 1.

Figure 5:
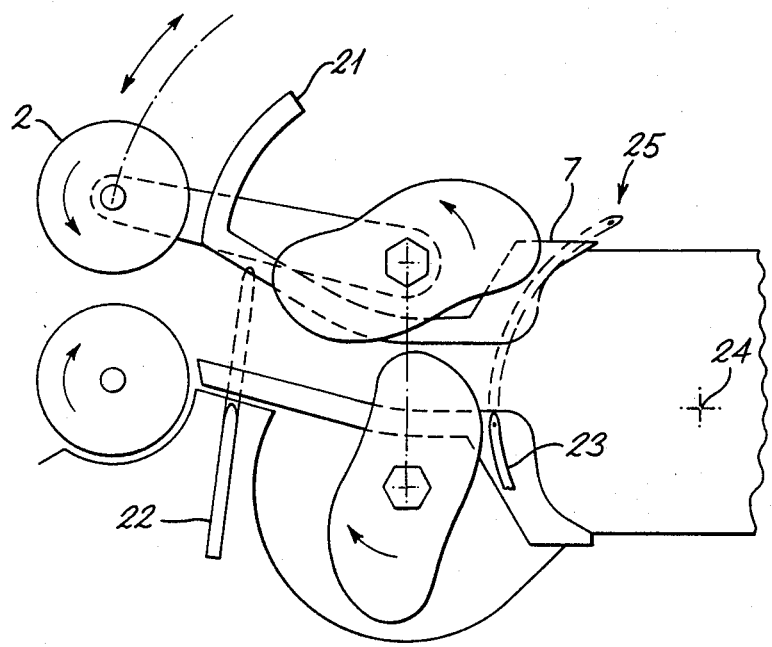
FIG. 5 is a simplified side elevation of an alternative arrangement to that shown in FIG. 1.

Referring now to FIG. 5, this shows the compactor 100 incorporated in a more conventional baler. When a bale is about to be tied, the feed roller 2 is lifted on its arc of movement and a gate 22 raised to cut off the flow of crop momentarily whilst twine-tying needles 23 (which are pivoted about point 24) pass twines around the bale for knotters placed at 25 to secure with knots.

An extension 21 to the top fixed elements 7, prevents crop from engaging with the top compaction rotor whilst bale tying is being completed.

Expected advantages of at least the preferred embodiments of the device of the present invention over previously known plunger systems are: (1) they avoid or at least significantly reduce the uneven torque which occurs in plunger systems; (2) they result in smaller and more economic driveline components for a similar mean power input; (3) it is envisaged that they will require a lower mean power for a given throughput and density; and (4) they are capable of providing a higher density product for a similar mean power input.

We claim:

1. A compression device for compressing fibrous material comprising: two double-lobed rotors mounted for rotation on spaced parallel axes, one of said rotors when viewed along its axis of rotation being slightly of an S-shape and having a substantially constant width, except at the end portions thereof, that is at least of the order of one-half of the length thereof and the other of said rotors when similarly viewed along its axis of rotation being a mirror image of said one rotor, said rotors being connected to counter-rotate about said axes with a ninety degree phase difference therebetween said rotors being aligned and opposed and said axes being spaced apart a distance sufficient to enable intermeshing of said rotors while providing a continually varying passageway therebetween having an entrance end and an exit end, whereby during rotation of said rotors to apply periodic pulses of pressure to material within said passageway as the material is fed into said entrance end and passes between said rotors in a direction determined by their senses of rotation.

2. A device as claimed in claim 1 including fixed guide elements defining in the passageway a throat section through which the fibrous material is forced by the lobes of the rotors during their rotation.

3. A device as claimed in claim 2 in which the guide elements have trailing edges arranged to inhibit material from passing back through the throat section in a direction opposite to that determined by the senses of rotation of the rotors.

4. A device as claimed in claim 1 wherein the two rotor axes are horizontally disposed with one at a higher level than the other.

5. A device as claimed in claim 4 including a feedback member positioned beneath the lower rotor to collect material which may drop down after passage through the passageway and is then returned to the entrance end of the passageway upstream of the two rotors by the rotation of the lower rotor.

6. A device as claimed in claim 4 including a pair of rotor-feeding rolls arranged to compact the material as it is fed to the rotors.

7. A device as claimed in claim 6 in which the two rotors and roll pair rotate respectively on vertically spaced horizontal axes and including means pivotally mounting the upper roll and loading it towards the lower roll.

8. A device as claimed in claim 1 in which each of the two rotors comprises one element of a bank of such rotors.

9. A device as claimed in claim 8 in which lobes of adjacent rotor elements are angularly spaced so as to reduce the power necessary to rotate the rotors in the bank.

10. A device as claimed in claim 9 in which the rotor lobes are arranged so as to lie in one of a herringbone and a helical formation when viewed in the direction of material flow through the device, the lobes of the two rotors of the element in the middle of the bank being arranged to contact material fed to the bank before contact by successive pairs of lobes of the other rotor elements.

11. A device as claimed in claim 1 in which the surfaces of the end portions of the rotor lobes, as viewed along the axis of rotation, are rounded.

12. A device as claimed in claim 11 including a freewheeling roller mounted to the end of each rotor lobe for rotation about an axis parallel to that of said rotor with the circumferential surface of said roller forming a part of the rounded surface of said lobe, whereby to reduce drag and frictional effects of the material on said lobe.

13. A baler having a bale chamber with a centre line and incorporating, as a feed section, a device as claimed in claim 2, the throat section having a centre line positioned above said centre line of said bale chamber so as to encourage a more even vertical fill of said chamber during operation of the baler.

* * * * *